S. G. GEORGE.
THRESHING MACHINE.
APPLICATION FILED NOV. 4, 1912.
1,082,191.
Patented Dec. 23, 1913.
4 SHEETS—SHEET 1.
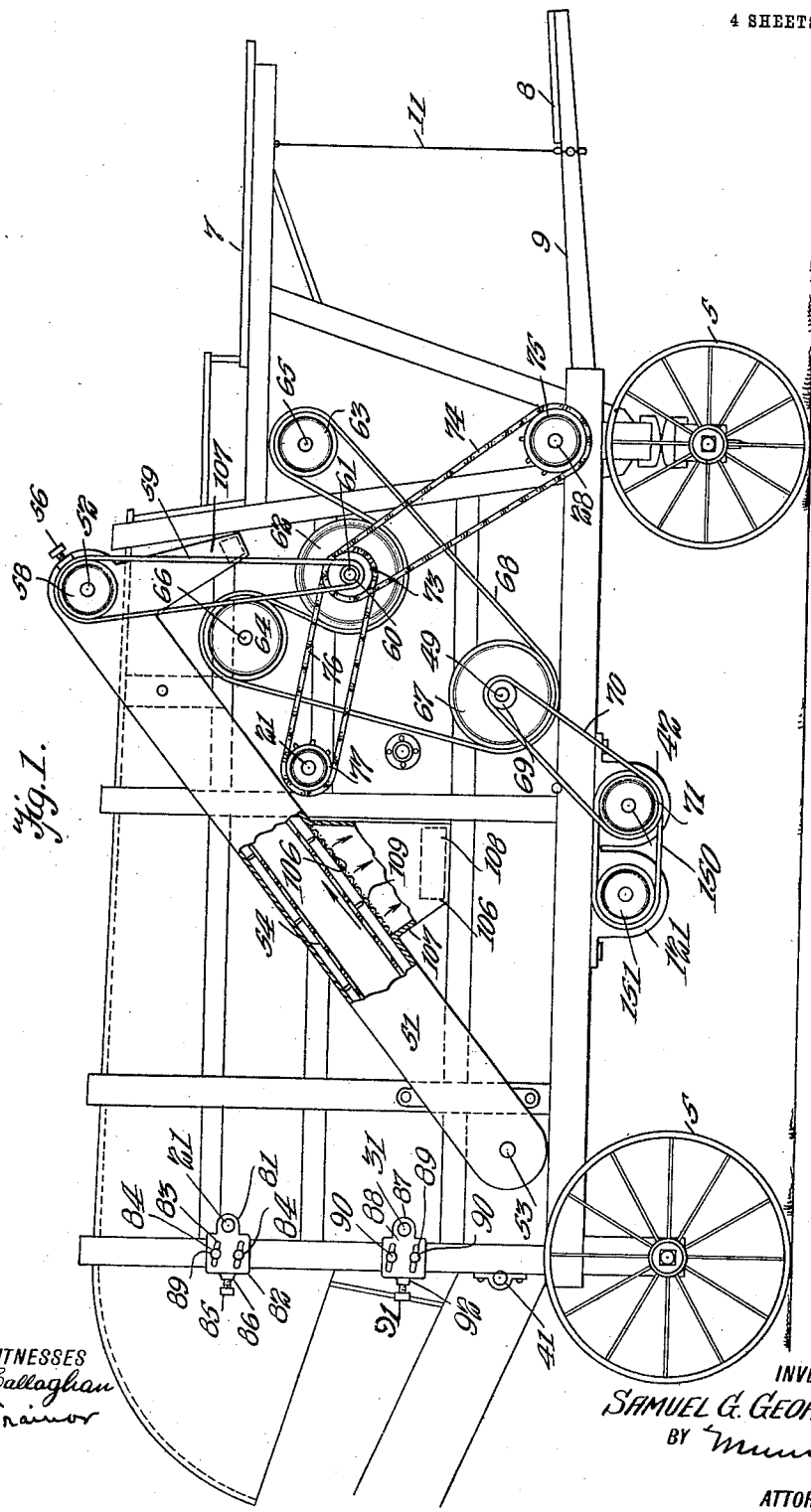
WITNESSES
E. M. Callaghan
C. E. Trainor
INVENTOR
SAMUEL G. GEORGE,
BY Munn & Co.
ATTORNEYS

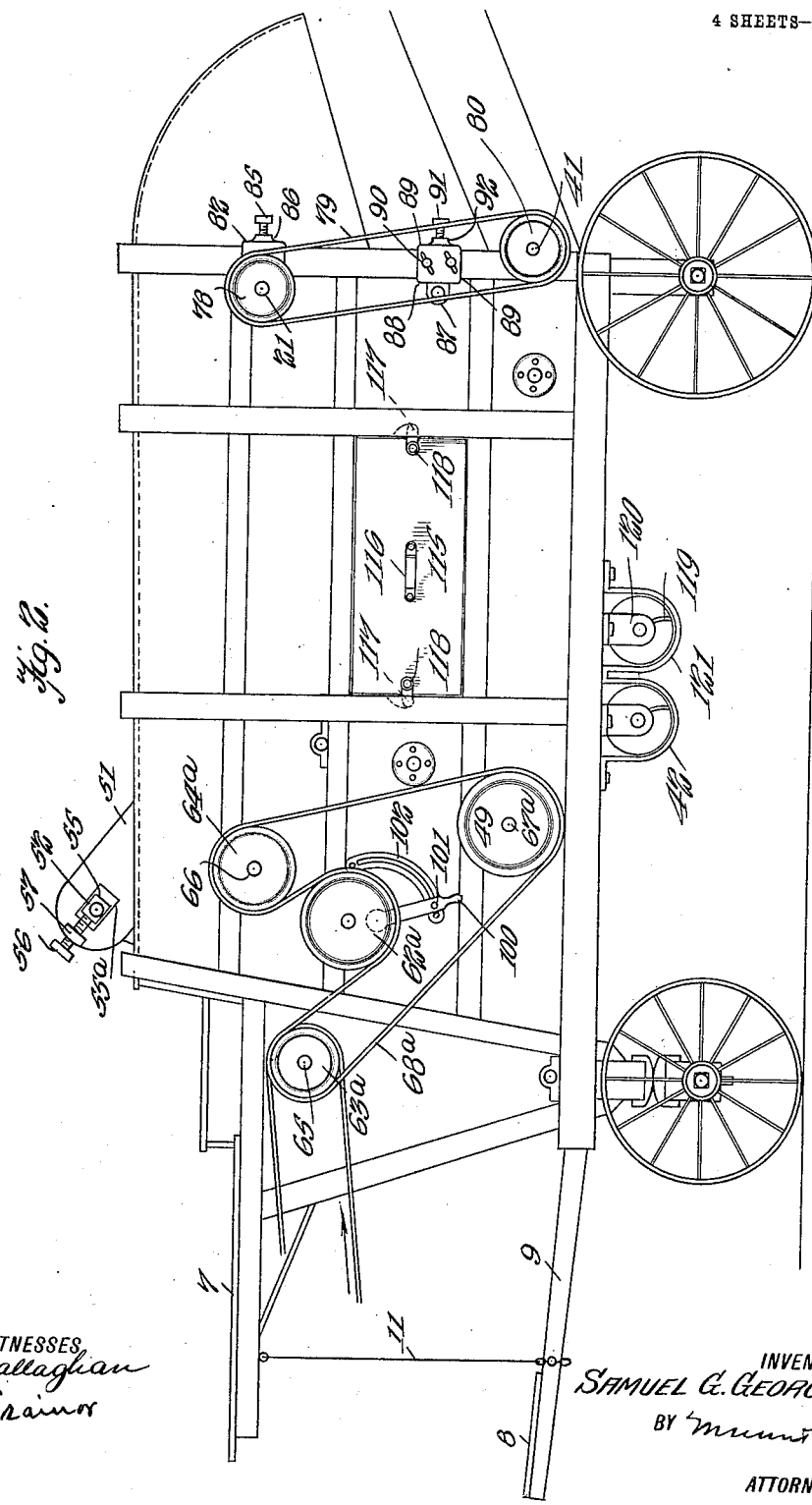

S. G. GEORGE.
THRESHING MACHINE.
APPLICATION FILED NOV. 4, 1912.
1,082,191.
Patented Dec. 23, 1913.
4 SHEETS—SHEET 3.
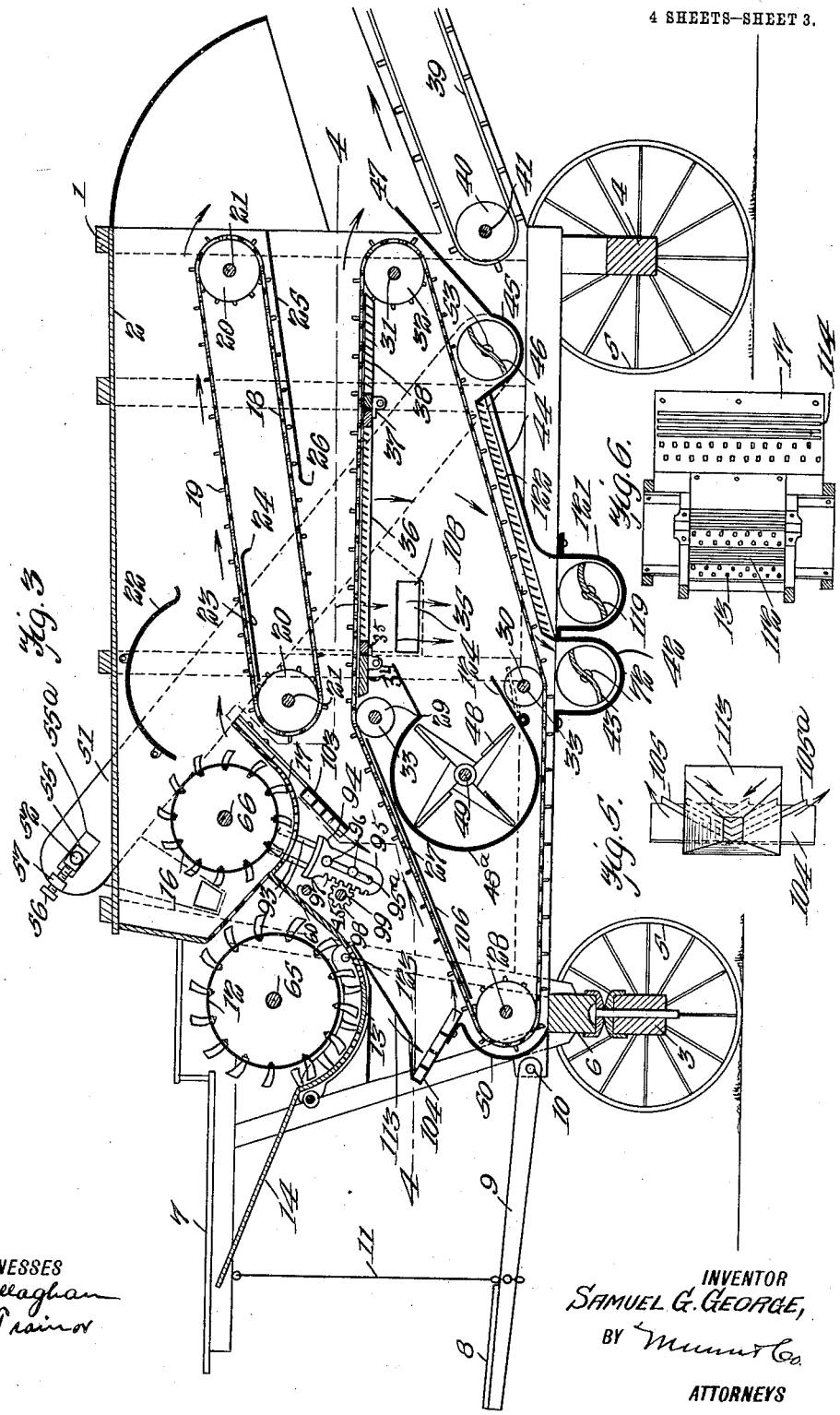
WITNESSES
INVENTOR
SAMUEL G. GEORGE,
BY
ATTORNEYS S. G. GEORGE.
THRESHING MACHINE.
APPLICATION FILED NOV. 4, 1912.
1,082,191.
Patented Dec. 23, 1913.
4 SHEETS—SHEET 4.
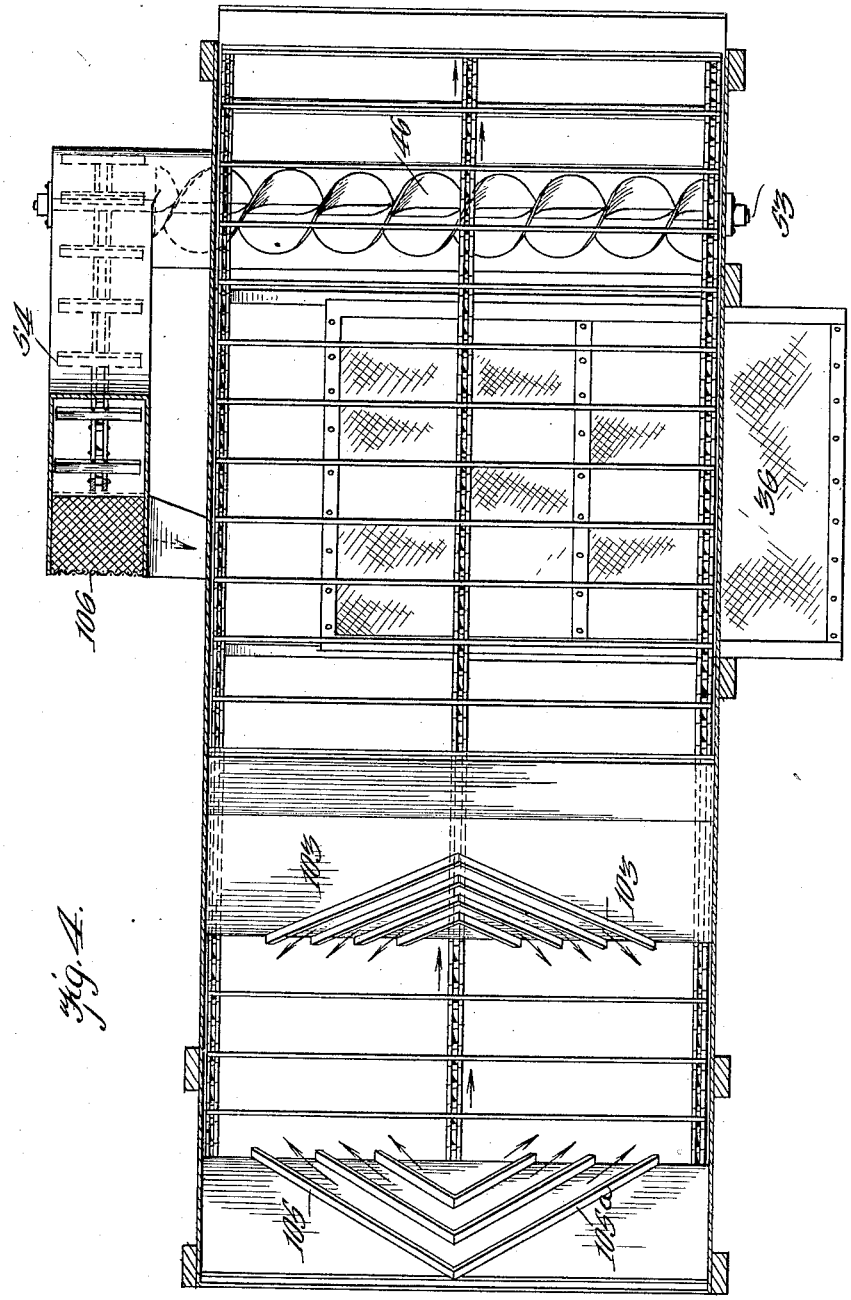
WITNESSES
INVENTOR
SAMUEL G. GEORGE,
BY
ATTORNEYS

UNITED STATES PATENT OFFICE.

SAMUEL G. GEORGE, OF CONRAD, MONTANA, ASSIGNOR TO GEORGE SEPARATOR COMPANY, OF GREAT FALLS, MONTANA, A CORPORATION OF MONTANA.

THRESHING-MACHINE.

1,082,191. Specification of Letters Patent. Patented Dec. 23, 1913.

Application filed November 4, 1912. Serial No. 729,198.

*To all whom it may concern:*

Be it known that I, SAMUEL G. GEORGE, a citizen of the United States, and a resident of Conrad, in the county of Teton and State of Montana, have made new and useful Improvements in Threshing-Machines, of which the following is a specification.

My invention is an improvement in threshing machines, and has for its object, the provision of a simple machine of the character specified, which will be economical both in cost, of keep, and operation, retrieving the greatest possible quantity of grain, and in the best possible condition.

In the drawings: Figure 1 is a side view of the improvement, with parts broken away; Fig. 2 is a side view from the opposite side; Fig. 3 is a longitudinal vertical section; Fig. 4 is a section on the line 4—4 of Fig. 3; Fig. 5 is a reduced plan view of the hopper below the first cylinder; and, Fig. 6 is a reduced plan view of the concave.

The present embodiment of the invention comprises a frame 1, and a housing 2 for inclosing the frame, and the thresher is supported by a front axle 3 and a rear axle 4, each axle having wheels 5. The front axle 3 is pivoted to a bolster 6, secured to the frame, and a feed board or table 7 is arranged at the front of the frame, above a foot board 8. The foot board 8 is secured at the outer ends of arms 9, hinged to the frame at 10, the arms being suspended from the feed table by rods or wires 11. A cylinder 12 is journaled transversely of the frame, at the inner end of the feed table, and a concave 13 is supported below the cylinder, both cylinder and concave having the usual teeth. An inclined plate 14 is arranged in front of the concave, the lower end of the plate contacting with the forward edge of the concave, and a second plate 15 inclined in the opposite direction to plate 14 is arranged at the rear of the concave. A second cylinder 16, of smaller diameter than cylinder 12 is arranged behind cylinder 12, and a concave 17 is supported below the cylinder. The front edge of the concave abuts against the rear end of plate 15. The rear edge of concave 17 is above the forward and lower end of an endless conveyer, consisting of spaced endless chains 18, connected by transverse slats 19, and supported on rollers or wheels 20 on shafts 21, journaled in the frame. A hood 22, arc-shaped in cross section is arranged above and behind cylinders 16, for deflecting the grain onto the conveyer, and a plate 23 is arranged below the upper run of the said conveyer, at the front end thereof. The conveyer inclines upwardly toward its rear end, and the plate 23 extends somewhat less than half the length of the conveyer, the rear end of the plate being curved downwardly, as shown at 24. A plate 25 is arranged below the lower run of the conveyer, at the rear end thereof, the front edge of the plate curving downwardly, as shown at 26, and being spaced slightly behind the rear edge of plate 23.

An endless conveyer 27 is arranged below both cylinders and the first-named conveyer, the said conveyer 27 being supported on four shafts 28—29—30 and 31 journaled in the frame. The conveyer is composed of spaced chains connected by transverse slats, and the shafts 28 and 31 are provided with sprocket wheels 32 for engaging the chains, the shafts 29 and 30 having plain wheels 33 for supporting the chains. The shaft 29 divides the upper run of the conveyer 27 into a rear substantially horizontal portion, and a front portion inclining downwardly toward shaft 28, and the said shaft 28 is directly below the shaft of cylinder 12. The shaft 30 performs a like service for the lower run of the conveyer, as will be noticed from an inspection of Fig. 3, the front portion being horizontal, however, and the rear portion inclined.

A plate 34 is arranged transversely of the front end of the rear portion of the upper run of the conveyer, and the said plate is provided with lugs 35 for supporting the front edge of a screen 36. The rear edge of the screen is supported by lugs 37 on a screen 38 arranged between screen 36 and the shaft 31. The rear end of the conveyer 27 delivers to the conveyer 39, of the straw carrier, the said conveyer being supported on rollers or wheels 40, on shafts 41, but one of which is shown.

A housing 42 is arranged below the frame, between the front and rear axles, and below shaft 30, and a screw conveyer 43 is arranged for rotation in the housing. A plate or floor 44 is arranged below the rear portion of the lower run of conveyer 27, the said plate or floor extending rearwardly to a connection with a housing 45, having arranged therein a screw conveyer 46. The housing 45 is integral with the plate or floor, and the housing has an extension 47, at its rear edge, the extension inclining upwardly toward its rear edge, the said extension being between shafts 31 and 41, and in such position that any grain passing rearwardly on the conveyer 27 will be caught and deflected into the housing 45.

A fan 48 is secured to a fan shaft 49, journaled in the frame between the front portions of the runs of the conveyer 27, and a transversely curved shield 50 is arranged in front of the front end of the conveyer, when it passes around shaft 28. An elevator box 51 is arranged in inclined position at one side of the frame, and a shaft 52 is journaled transversely at the upper end of the box.

The shaft 53 of the screw conveyer 46 is extended through the lower end of the box, and an endless conveyer 54 is supported on wheels on the shafts in the usual manner. The shaft 52 is journaled in bearings 55, sliding in guides 55$^a$ on the box, said bearings being moved by means of screws 56, journaled in bearings 57 on the box and rotatably connected to the bearings 55.

A pulley 58 is secured to the shaft 52 outside the box, and the pulley is connected by means of a belt 59 with a pulley 60 on a shaft 61. A second pulley 62 is secured to shaft 61, and pulleys 63 and 64 are secured to the shafts 65 and 66 of cylinders 12 and 16 respectively. A pulley 67 is secured to the fan shaft 49, and a belt 68 passes over pulleys 64—65 and 67, and under pulley 62, so that shaft 61 is rotated in the opposite direction to shafts 65—66. The shafts 61—65—66 and 49 are connected in the same manner on the opposite side of the frame, that is at the opposite ends of the shafts, as shown in Fig. 2. Pulleys 62$^a$—63$^a$—64$^a$ and 67$^a$ are secured to the opposite ends of the said shafts 61—65—66 and 49, and a belt 68$^a$ connects the pulleys passing outside of pulleys 63$^a$—64$^a$ and 67$^a$, and inside of pulley 62$^a$. A second pulley 69 is secured to shaft 49, and a belt 70 connects the pulley 49 to a pulley 71 on the shaft 72 of the screw conveyer 43. A sprocket wheel 73 is secured to shaft 61, and a chain 74 connects the wheel to a wheel 75 on shaft 28 of conveyer 27. A second wheel (not shown) is secured to the shaft 61 on the inner side of wheel 73, and a chain 76 connects the wheel with a wheel 77 on shaft 21 at the front end of the uppermost conveyer 18—19. A pulley 78 is secured to the shaft 21 at the rear end of conveyer 18—19, and a belt 79 connects the said pulley with a pulley 80 on the shaft 41 of the straw carrier or elevator. The cylinder 12 is driven from the engine, and in turn drives shafts 66 of cylinder 16, and shaft 49 of fan 48. Through shaft 62 the cylinder drives shaft 21 of conveyer 18—19, shaft 28 of conveyer 27, and shaft 52 of the elevator 54, and through shaft 49, shaft 72 of screw conveyer 43. The elevator 54 drives screw conveyer 46.

The rear shaft 21 of conveyer 18—19 is movable toward and from the front shaft 21 and is also adjustable vertically. The said rear shaft is journaled in bearings 81 in plate 82, which is provided with inclined parallel slots 83, which are engaged by headed pins 84 on the frame. Screws 85 are threaded through threaded bearings 86 on the plates and rotatably engage the frame. By turning the screws, the plates are moved, and the slots and pins cause the plates to move upwardly and downwardly, as well as rearwardly and forwardly.

The shaft 31 is arranged in the same manner as shaft 21 just described, the said shaft 31 being journaled in bearings 87 in plates 88, having inclined slots 89, engaging headed pins 90 on the frame. A screw 91 is threaded through a nut or threaded bearing 92 on each plate, and is rotatably connected with the frame at its inner end, so that when the screw is turned, the plate is moved longitudinally.

The concave 17 is smaller than the concave 13, and the said concave 17 has two rows of teeth 93 which extend perpendicularly to the concave, and are capable of adjustment toward and from the cylinder 16. The teeth 93 are mounted on a transversely concave plate 94, having its concave side upward. The plate 94 has rearwardly extending arms 95 at its ends, and each arm is longitudinally slotted at 95$^a$.

Headed pins 96 are arranged on the frame for engaging the slots 95$^a$, a pair of pins for each slot, and the forward edge of each arm is toothed, as indicated at 97. A pinion 98 engages the teeth of each arm, and the pinions are on the ends of a shaft 99. An arm 100 is secured to one end of the shaft, and the arm is provided with a pin 101 engaging a curved guide 102 on the frame.

It will be evident that when the arm 100 is swung the shaft will be rotated, and the pinions will move the arms in one or the other direction, to project the teeth to a greater or less extent through the concave. The cylinder 16 is a beater rather than a cylinder. A spreading plate 103 is arranged below concave 17, in inclined position, the said plate inclining forwardly toward its lower end. A similar plate 104 is arranged at the front end of the upper run of conveyer 27, the said plate inclining downwardly toward its rear end, and being supported by the curved shield 50, before mentioned. Each of the plates 103—104 is provided with a plurality of ribs, each rib consisting of two portions 105—105$^a$ meeting at an angle, as shown more particularly in Fig. 4. The apex of the ribs is upward, and the sides thereof incline downwardly toward each side of the spreading plate, in order that the said ribs will conveniently spread and distribute the grain over the conveyer 27.

The concave 13, as shown more particularly in Fig. 6, is provided with grates 112, two grates being provided, to permit the threshed grain to fall from the concave on to the hopper 113, shown in Fig. 5, the said hopper being directly below the concave. The rear end of the hopper 113 extends far enough rearwardly to receive the grain falling through the rearmost grate, so that all of the grain that is beaten out by the first cylinder passes downwardly through the grates and the cylinder 113 and the said grain is delivered at the apex of the highest rib of the spreading plate 104. The ribs deflect the grain to both sides of the spreading plate, thus conveniently distributing the said grain to the sides of the conveyer 27. The concave 17 is also provided with a grate 114, directly above the spreading plate 103, and the grain beaten from the heads by the second cylinder passes through the grates 114 of the concave 17 on to the spreading plate 103 from which it is delivered to the conveyer 27.

It will be noticed from an inspection of Figs. 1 and 3, that the elevator box 51 is provided with an opening in its bottom and intermediate the ends of the box, the said opening being covered by a screen 106 of perforate material, as for instance wire mesh and a chute 107 leads from the opening into the body of the machine, communicating with the body by means of an opening 108. The opposite side of the body is provided with a door opening which may be closed by a door 115, the said door having a handle 116 for convenience in manipulating the same, and being held in place by latches 117 hinged to the ends of the door at 118. The latches engage the openings in the frame and by swinging them upwardly, the door may be disengaged and removed if desired.

A screw conveyer 119 is journaled in bearing brackets 120 adjacent to the conveyer 43, the said conveyer 119 being inclosed in a housing 121. The plate or floor 44 delivers at its front end to the housing 121, and a screen 122 is arranged below the lower run of the conveyer 27 above the housing 121 and the plate 44. The screen 122 is of such mesh that the grain being threshed, as for instance wheat, will not fall through the said screen, but will pass over the same and into the housing 42.

The machine is especially adapted for separating grains, as for instance flax from wheat, or weed seeds and the like from wheat or other grains. The larger size grain being threshed passes over the screen 122, while the smaller size passes through the same and is ejected from the machine by the screw conveyer 119.

It will be noticed that the concave 13 is hinged at its rear edge, as indicated at 123, while the front edge is held in the position shown in Fig. 3. With this arrangement, the concave may be lowered for cleaning or the like. It will also be noted that the screen 36 is removable, as shown in Fig. 4, by sliding the said screen endwise on the lugs 35 and 37. The character of the screen 36 depends upon the grain being threshed, so that the improved thresher is adapted for use with any kind of grain by providing a screen 36 to suit. The screen 122 is also removable in the same manner as is screen 36. After the screen 36 has been withdrawn laterally of the machine, the rear portion 38 may also be removed. The fan casing 48$^a$ is provided with a hinged flap 124 at its rear lower edge, as shown in Fig. 3, said flap being provided for regulating the blast delivered by the fan.

In operation, the straw is fed to the machine in the usual manner, and is first acted upon by the cylinder 12 and the concave 13 in the usual manner. The grain beaten out by the cylinder and the concave falls through the grating of the concave on to the distributing plate 104, and by the said plate the grain is distributed on the carrier 27. The carrier or conveyer 27 carries the grain and the chaff over the screens or sieves 36 and 38, while the unthreshed grain and the straw passes from the cylinder 12 to the cylinder 16, and the said cylinder in coöperation with the said cylinder 17 completes the beating out of the grain. The grain from the concave 17 falls on to the distributing board 103 and the said board evenly distributes the grain onto the carrier 27, so that the said grain is passed from the sieves or screens 36 and 38 with the grain over the plate 104. As the grain and chaff passes rearwardly from the screens 36 and 38 the blast of air is driven through the mass driving out the chaff on to the straw carrier, while the grain falls through upon the screen 122, and is delivered to the conveyer 43, which passes to a suitable receiving device, as for instance a bag. The plate or board 24 prevents the straw from passing through the carrier 18—19, and the plate 24 returns any unthreshed grain to the carrier 27 above the screen 36. The straw is delivered by the carrier 18—19 to the straw carrier 39, and the chaff is also delivered by the carrier 27 to the said straw carrier.

That portion of the grain from which the husk has not been removed will be delivered to the conveyer 46, and will be moved by the said conveyer into the elevator box at the lower end thereof. The elevator box will deliver this unhusked grain in front of the cylinder 16, where it will again be acted upon by the cylinder 16 and the concave 17.

Any threshed grain that may be delivered to the elevator will not be carried to the top thereof to be acted upon by the cylinder 16, but will pass through the screen 109 in the bottom of the said elevator and by means of the chute 107 the said threshed grain will be delivered to the conveyer 43. Thus no grain will be broken in the improved thresher, for it will not be acted upon a second time by the cylinder.

It will be noted that there is no vibrating mechanism in the improved machine. In the usual machine having vibrating mechanism for cleaning, the machine must be arranged absolutely level, otherwise it will not work, since the grain tends to settle in the lowest part of the machine, thus clogging the same. With the improved machine the machine need not be exactly level, for the reason that there are no vibrating devices used in connection therewith, all of the cleaning mechanism moving continuously in the same direction.

The conveyer 119 is driven by means of a belt 150, which connects a pulley 151 on the said conveyer with a pulley on the conveyer 43.

I claim:

1. In a threshing machine, provided with threshing means, a conveyer for receiving the straw therefrom and delivering it at the opposite end of the machine, a conveyer for receiving the grain and chaff from the threshing means and for conveying the grain and chaff to the opposite end of the machine from the threshing means, said second conveyer having a portion of its run arranged below the threshing means, screening devices beneath the rear portion of the upper run of the said conveyer, and a fan delivering below the screens and through the same.

2. In a threshing machine provided at one end with threshing means, a conveyer for moving the straw from the threshing means to the opposite end of the machine, endless conveyer for conveying the grain and the chaff from the threshing means to the said opposite end of the machine, said endless conveyer having a portion of its upper run arranged below the threshing means, screening devices beneath the rear portion of the upper run of the said endless conveyer, and a fan below the screens and delivering through the same.

3. In a threshing machine provided at one end with threshing means, a conveyer for moving the straw from the threshing means to the opposite end of the machine, endless conveyer for conveying the grain and the chaff from the threshing means to the said opposite end of the machine, said endless conveyer having a portion of its upper run arranged below the threshing means, and screening devices beneath the rear portion of the upper run of the said endless conveyer.

4. In a threshing machine, a cleaning device comprising an endless conveyer, means for supporting the said conveyer for movement longitudinally of the machine, and with the front portion of the upper run of the conveyer inclining upwardly and with the rear portion approximately horizontal, a grain board beneath the inclined portion of the upper run, a guide for screens beneath the rear portion of the upper run of the conveyer, and removable screens for engaging the guides.

5. In a threshing machine, an endless conveyer, means for supporting the said conveyer for movement longitudinally of the machine, with the rear portion of its upper run approximately horizontal, and with the front portion of its upper run inclining upwardly toward the rear portion, removable screens beneath the rear portion of the upper run, a fan between the runs and delivering its blast through the screens, a distributing board at each end of the front portion of the upper run, each of the said boards having ribs for deflecting grain to each side of the conveyer, and a concave above each of the said portions, each concave having gratings above the board for permitting the passage of the threshed grain.

6. In a threshing machine, an endless conveyer, means for supporting the said conveyer for movement longitudinally of the machine, with the rear portion of its upper run approximately horizontal, and with the front portion of its upper run inclining upwardly toward the rear portion, removable changeable screens beneath the rear portion of the upper run, a fan between the runs and delivering its blast through the screens, a distributing board at each end of the front portion of the upper run, each of the said boards having ribs for deflecting grain to each side of the conveyer, and threshing means above the distributing boards.

7. In a threshing machine, an endless conveyer, means for supporting the said conveyer for movement longitudinally of the machine, with the rear portion of its upper run approximately horizontal, and with the front portion of its upper run inclining upwardly toward the rear portion, removable screens beneath the rear portion of the upper run, a cylinder above the inclined portion of the conveyer, a conveyer below the rear portion of the conveyer, an elevator to which the conveyer delivers, said elevator delivering to the cylinder, and having a screened opening intermediate its ends, and a chute for receiving grain from the open ing and delivering it below the screens, and a conveyer for receiving the grain passing through the screens and the chute and delivering it from the machine.

8. In a threshing machine, an endless conveyer, means for supporting said conveyer for longitudinal movement with the rear portion of its upper run approximately horizontal, and with the front portion of its upper run inclining upwardly toward the rear portion, removable screens beneath the horizontal portion, means between the runs of the conveyer for delivering a blast of air through the screens, the rear portion of the lower run of the conveyer being inclined upwardly toward its rear end, a pair of transverse conveyers arranged below the conveyer near the center thereof and delivering at the side of the machine, and an inclined screen of smaller mesh than the grain to be threshed above the rearmost conveyer.

9. In a threshing machine provided with threshing means, an endless conveyer for receiving the mixed grain and straw from the threshing means, screens in connection with the conveyer for separating the grain from the straw, and means for evenly distributing the grain and the straw on the conveyer, said means comprising distributing boards, each board having a plurality of ribs, each rib consisting of two portions inclined with respect to each other, the said portions meeting at the center of the board and inclining downwardly and outwardly toward the side edges of the board, said boards being inclined and having their lower edges adjacent to the conveyer.

10. In a threshing machine provided with threshing means, an endless conveyer for receiving the mixed grain and straw from the threshing means, screens in connection with the conveyer for separating the grain from the straw, and means for evenly distributing the grain and the straw on the conveyer.

SAMUEL G. GEORGE.

Witnesses:
C. E. TRAINOR,
SOLON C. KEMON.

---

Copies of this patent may be obtained for five cents each, by addressing the "Commissioner of Patents, Washington, D. C."